Jan. 1, 1929.  1,697,115
H. HARGREAVES
SELF FEEDING ELECTRICALLY HEATED WATER BOILER
Filed Oct. 21, 1926   2 Sheets-Sheet 1

Jan. 1, 1929.  1,697,115
H. HARGREAVES
SELF FEEDING ELECTRICALLY HEATED WATER BOILER
Filed Oct. 21, 1926    2 Sheets-Sheet 2
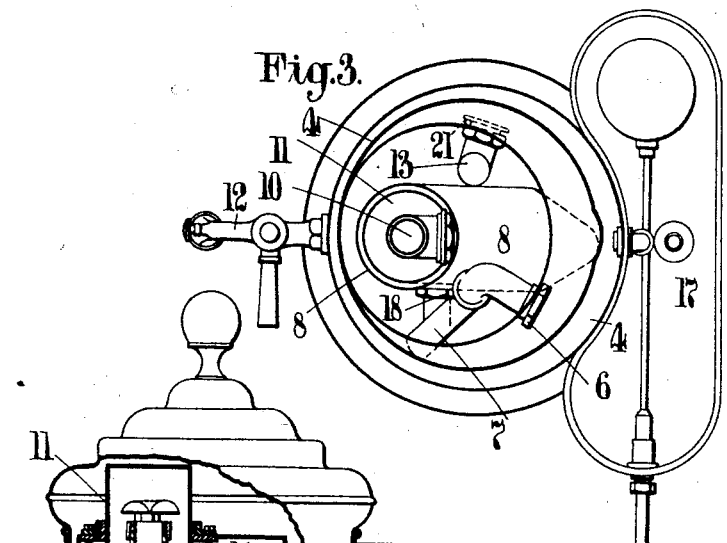
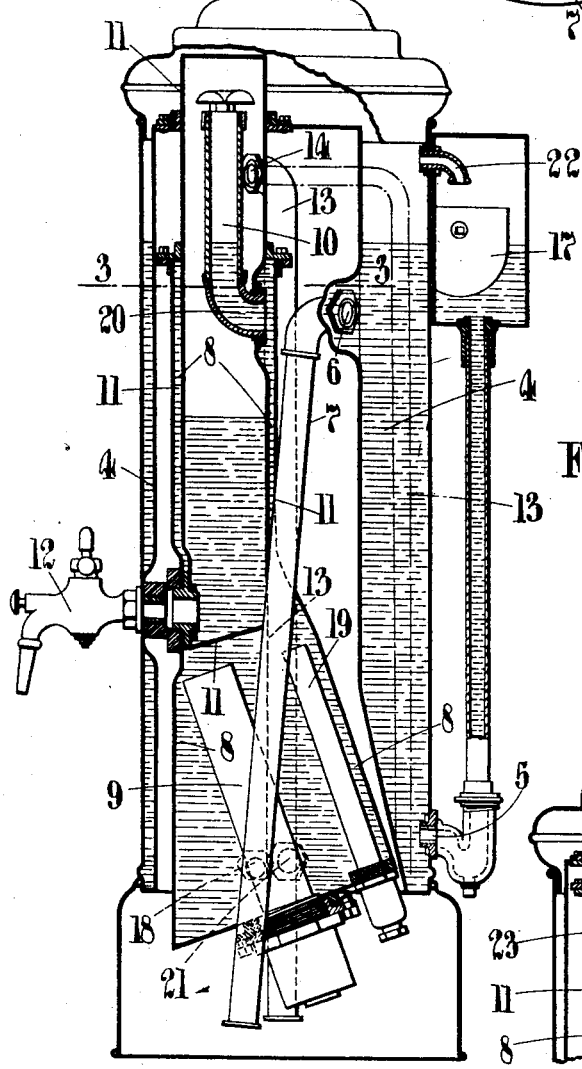
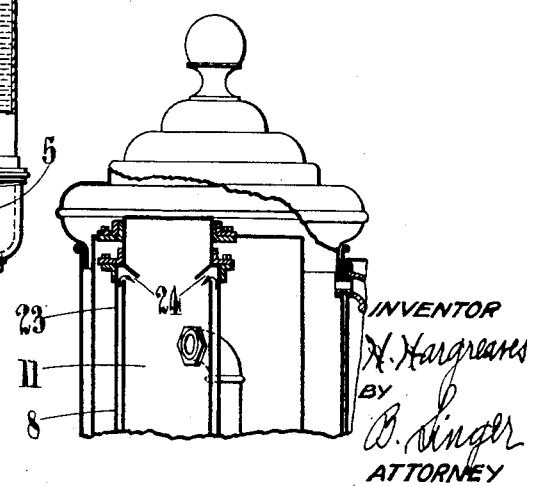
INVENTOR
H. Hargreaves
BY
B. Singer
ATTORNEY Patented Jan. 1, 1929.

1,697,115

UNITED STATES PATENT OFFICE.

HAROLD HARGREAVES, OF BURNLEY, ENGLAND, ASSIGNOR TO JACKSON BOILERS LIMITED, OF LEEDS, ENGLAND, A BRITISH COMPANY.

SELF-FEEDING ELECTRICALLY-HEATED WATER BOILER.

Application filed October 21, 1926, Serial No. 143,245, and in Great Britain November 17, 1925.

This invention relates to electrically heated water boilers of the type having a bulk water chamber, preferably self-feeding, and with the inlet for cold water at or towards the bottom thereof, connected towards the top with a boiling chamber fitted with an expansion pipe which delivers the boiling water to a collecting chamber for boiling water fitted with a draw off tap or the like for the delivery of boiling water.

According to the invention an overflow pipe is provided extending from a suitable position in the collecting chamber to the lower part of the bulk water chamber to heat up the bulk water. The bulk water chamber is preferably in the form of an outer shell within which the boiling and collecting chambers are disposed. The arrangement of the boiling and collecting chamber is also preferably such that the collecting chamber is maintained at boiling point by the heat of the boiling chamber, for example the collecting chamber for this purpose may be located within the boiling chamber or an extension thereof.

In order that the invention may be better understood, it will now be described with reference to the accompanying drawings in which:—

Figs. 1 and 2 are somewhat diagrammatic vertical sections of two forms of boiler made according to the invention.

Fig. 3 is a part section on line 3—3, Fig. 2.

Fig. 4 is a modification of the form shown in Figs. 2 and 3.

Figure 1:
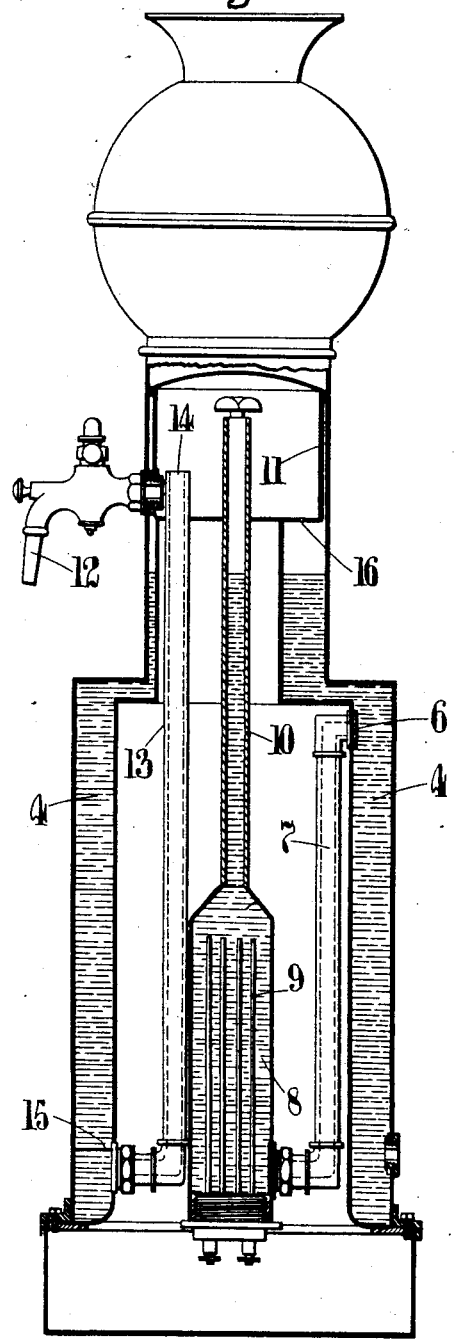

Referring to Fig. 1, 4 is the bulk water chamber formed as shown as a hollow annular shell or jacket suitably constructed and supported with an inlet 5 for cold water and on outlet 6 towards the top thereof. 7 is a pipe connecting the outlet 6 with the lower portion of a boiling chamber 8 disposed within the hollow central portion of the chamber 4. In the boiling chamber 8, electrical heating elements 9 are disposed. These are of any required number, type and size and are suitably connected to a desired circuit or circuits. 10 is an expansion pipe leading from the boiling chamber 8 to a collecting chamber 11 suitably supported in the narrowed upper extension of the outer shell of the bulk water chamber 4. 12 is a draw off tap from the collecting chamber 11 and 13 an overflow pipe the upper open end 14 of which comes a required distance above the bottom of the collecting chamber 11 which pipe 13 opens at its lower end towards the bottom of the bulk water chamber 4. 15 is a baffle extending a desired angular distance around and in the chamber 4 just above the outlet from the pipe 13 to prevent the boiling water therefrom rising straight up and causing it to be distributed through the bulk of the water in the chamber 4. 16 is a weeping hole in the bottom of the collecting chamber 11 for slowly draining any water left therein back to the bulk water chamber 4.

In use it will be appreciated that with the required elements 9 in circuit the water in the boiling chamber 8 is readily boiled and rises in the expansion pipe 10 and flows over into the collecting chamber 11 from whence it can be drawn off by the tap 12. If the supply of boiling water to the collecting chamber 11 exceeds the demand the boiling water passes through the upper open end 14 of the overflow pipe to the bottom of the bulk water chamber 4, with the water in which it mixes for preheating purposes.

The form of carrying the invention into effect shown in Figs. 2 and 3 includes an automatic or self-feeding ball valve chamber 17 in communication with the inlet 5 to the bulk water chamber 4, which in this case is also in the form of a substantially annular hollow shell or jacket. The outlet 6 therefrom has connected thereto a pipe 7 opening at 18 into the boiling chamber 8 which is shaped as shown. In the chamber 8 electrical elements 9 to a desired number and size are located as well as "bye-pass" elements 19. As will be seen the elements are inclined to the vertical to render them suitable for dealing with hard water by allowing fur to fall away.

The collecting chamber 11 in this case is located in the upper part of the boiling chamber 8 and is entirely surrounded by boiling water. In the side of the collecting chamber an elbow 20 carrying an expansion pipe 10 is mounted and this arrangement constitutes the expansion pipe from the boiling chamber to the collector. 13 is the overflow pipe whose upper open end 14 comes in a desired position in the collecting chamber 11 and whose lower end 21 opens into the bulk water chamber 4. The draw off tap 12 communicates through suitable nut and joint devices with the interior of the lower portion of the collecting chamber 11. 22 is a conduit for taking steam from the upper end of the bulk water chamber 4 to the ball float valve chamber 17 for condensing purposes. If desired in some cases the overflow pipe 13 may extend down to the lower part of the bulk water chamber as shown in dot and dash lines, Fig. 2.

The action of this form of device is generally similar to that described with reference to Fig. 1 but in this case the water in the collecting chamber 11 is kept boiling by the jacket of boiling water in the upper part of the boiling chamber, which comes around it.

With both forms of boiler it will be appreciated that a supply of actually boiling water is kept on hand ready to be drawn off and also that a quantity of bulk water is preheated when no boiling water is drawn off. This latter action provides a temporarily large flow of boiling water when such water is again required owing to the preheating of the bulk water before it flows to the boiling chamber.

The bye-pass immersion heater such as 19 has a minimum loading sufficient to maintain boiling in the boiling chamber and in the collecting chamber and the bye-pass is "on" during the whole time the boiler is in use, independent of whether the main loading is on or not. In some cases the bye-pass loading may be incorporated in the main immersion heater.

A thermostatic switch may be fitted in the outer shell to switch off the current to the main heating element when the water in the outer shell has reached a pre-determined temperature. A switch may also in some cases be operated from the draw off tap in order to switch current on at full whenever water is being drawn off. With these two switches wired in parallel the action of the boiler is entirely automatic.

Fig. 4 shews a modification of the form illustrated in Figs. 2 and 3 and in this modification the elbow 20 and expansion pipe 10 are replaced by an upper extension 23 of the jacket like portion of the boiling chamber 8, which comes around the upper portion of the collecting chamber 11 and forms an expansion pipe. Openings 24 are provided on the top of the collecting chamber for the passage of the boiling water thereto in the direction of the arrows.

What I claim and desire to secure by Letters Patent of the United States of America is:—

A boiler of the class described comprising a bulk water chamber having inner and outer walls spaced apart to receive the bulk water therebetween, a boiling chamber arranged in said bulk water chamber and spaced from the inner wall thereof and provided with an upwardly extending expansion pipe, heating means for the boiling chamber arranged therein, a duct connecting the bulk water chamber at an elevated point to the boiling chamber at a point near the bottom of the latter, a structure forming a collecting chamber for boiling water arranged in the upper portion of the bulk water chamber and into which the upper end of said expansion pipe extends so that said collecting chamber is supplied with boiling water from the boiling chamber, a faucet for the collecting chamber and an overflow pipe leading from the collecting chamber to and discharging into the lower portion of said bulk water chamber.

In witness whereof I affix my signature.

HAROLD HARGREAVES.